United States Patent [19]

Miura

[11] 4,175,387
[45] Nov. 27, 1979

[54] SECONDARY AIR SUPPLY SYSTEM FOR AN INTERNAL COMBUSTION ENGINE

[75] Inventor: Motohisa Miura, Toyota, Japan

[73] Assignee: Nippondenso Co., Ltd., Kariya, Japan

[21] Appl. No.: 871,933

[22] Filed: Jan. 24, 1978

[30] Foreign Application Priority Data

Jan. 26, 1977 [JP] Japan ................................ 52/7985

[51] Int. Cl.² ............................................. F01N 3/10
[52] U.S. Cl. .................................................... 60/290
[58] Field of Search ........................................ 60/290

[56] References Cited

U.S. PATENT DOCUMENTS

| | | | |
|---|---|---|---|
| 3,906,723 | 9/1975 | Matumoto | 60/290 |
| 3,908,370 | 9/1975 | Kuroda | 60/290 |
| 3,911,674 | 10/1975 | Goto | 60/288 |
| 3,924,409 | 12/1975 | Heilman | 60/290 |
| 3,975,905 | 8/1976 | Shimo | 60/290 |

*Primary Examiner*—Douglas Hart
*Attorney, Agent, or Firm*—Cushman, Darby & Cushman

[57] ABSTRACT

A system for controlling secondary air supply from an engine-driven air pump through a supply line into the engine exhaust manifold has a control valve with air inlet and outlet ports and a slidable, spring-biased valve seat member defining main and auxiliary air release openings. A first valve member is movable by a valve actuator to control the communication between the air inlet and outlet ports and the main air release opening. A second valve member is resiliently urged by a second spring against the valve seat member to control the communication between the auxiliary air release apertures in the valve seat member and the air release port. The valve actuator has first and second air pressure chambers connected to the secondary air supply line upstream of the secondary air control valve. The first control chamber is connected to the engine intake system. Control valves are provided to control the supply of air pressure into the first and second chambers such that, at least at the initial stage of an engine acceleration, the air release pressure at which the second valve member is moved away from the valve seat member to permit release of the secondary air is increased with resultant increase in the secondary air supply to the engine exhaust system. Pressure delay valves are provided for the control valves whereby the secondary air supply is interrupted when acceleration has lasted for more than a predetermined time.

2 Claims, 1 Drawing Figure

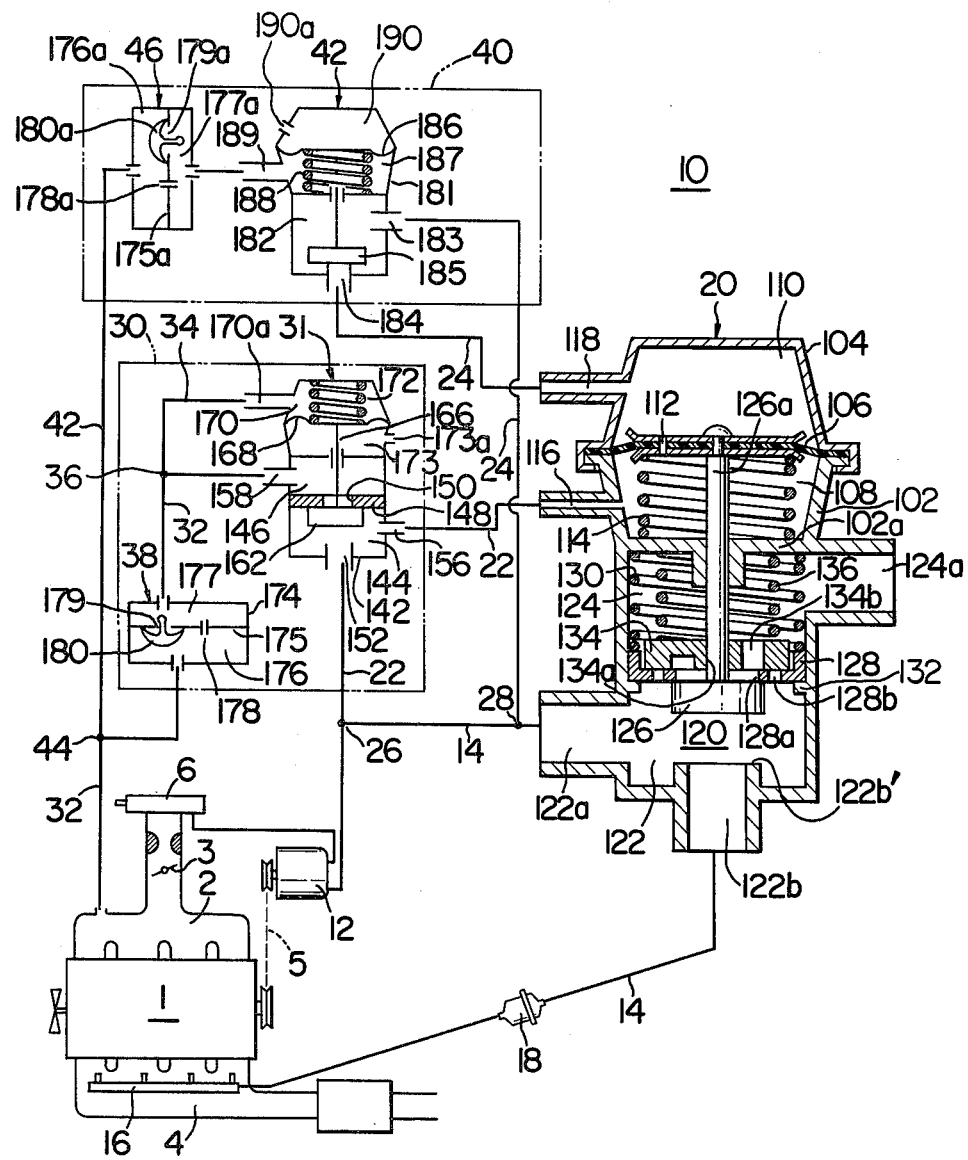

SECONDARY AIR SUPPLY SYSTEM FOR AN INTERNAL COMBUSTION ENGINE

BACKGROUND OF THE INVENTION

1. Field of the Invention

The present invention relates to a system for supplying secondary air into an exhaust system of an internal combustion engine and, more particularly, to a system for controlling the secondary air supply.

2. Description of the Prior Art

The heretofore known secondary air supply control system had a relief valve operative to keep the secondary air in a secondary air supply line at a pressure below a predetermined pressure and also had an air changeover valve operative to direct the air from an air pump selectively to the engine exhaust system or into the atmosphere or back into an air cleaner in accordance with the engine operating conditions. The relief valve was designed to be opened to release the pressurized air at a relatively low pressure level so as to increase the operative life of the air pump.

The percentages of HC and CO contents of engine exhaust gases, in general, are increased when engine speed is abruptly accelerated or decelerated. The solution to the increase in the HC and CO emission at the engine acceleration relied substantially entirely upon the secondary air supply, although the solution to the HC emission increase at the engine deceleration relied upon other control systems. At the engine acceleration, therefore, it was required to supply the secondary air into the engine exhaust system as much as possible. However, because the relief valve in the secondary air supply line was opened to release the secondary air into the atmosphere when the secondary air pressure exceeded the predetermined level, as discussed above, the engine exhaust system was not supplied with a sufficient amount of secondary air during engine acceleration operation, despite the fact that the air pump was operated to discharge sufficient secondary air.

In an attempt to solve the discussed problem, there has been proposed a secondary air supply control system which is operative at an abrupt engine acceleration to supply a secondary air of an amount larger than required during normal engine operation. This secondary air supply control system is disclosed in Japanese Utility Model Laid-Open Publication (Pre-Examination Publication) No. 50-61207 published on June 5, 1975. The system includes a relief valve actuator comprising a diaphragm which defines a chamber into which engine intake vacuum is introduced during normal engine operation to keep the amount of secondary air supply to the engine exhaust system substantially related to the engine intake air. The system is arranged such that, at an abrupt acceleration operation of the engine, the diaphragm chamber in the relief valve actuator is supplied with pressurized air from an air pump to close the relief valve so that all the air from the air pump is fed into the engine exhaust system. However, the supply of all the air from the air pump into the exhaust system would, in some instances, cause the problem of excess secondary air supply which leads to the overheating of exhaust gas purification device such as afterburner or three-way catalyst. According to the system disclosed in the Japanese publication referred to above, moreover, the secondary air supply at the increased rate is continued for all the engine acceleration operation period. Thus, if the acceleration operation lasts more than a predetermined time period, there would also be caused the problem of overheating of the exhaust gas purification device.

SUMMARY OF THE INVENTION

It is an object of the present invention to provide a secondary air supply control system which is operative to supply secondary air into an engine exhaust system at an increased rate at an abrupt engine acceleration operation and in which the pressure at which an air relief valve is opened is automatically controlled in accordance with various acceleration conditions.

It is another object of the present invention to provide a secondary air supply control system of the class specified above and which is operative to momentarily interrupt the secondary air supply in the case where the engine acceleration operation has lasted for more than a predetermined time period.

The secondary air supply system according to the present invention comprises an air pump adapted to be driven by an associated internal combustion engine; a secondary air supply line extending between the air pump and the engine exhaust system; valve means in the secondary air supply line for controlling the secondary air supply from the air pump into the engine exhaust system; a valve actuator operatively associated with the valve means and comprising first and second air pressure chambers, a diaphragm between the first and second air pressure chambers, a first spring member disposed in the first air pressure chamber to yieldably act on the diaphragm and restricted passage means intercommunicating the first and second air pressure chambers; a first control pressure line through which the air pressure produced by said air pump is supplied into the first air pressure chamber; first controlling means in the first control pressure line for controlling the air pressure supply to the first air pressure chamber; a second control pressure line through which the air pressure produced by the air pump is supplied into the second air pressure chamber; and second controlling means in the second control pressure line for controlling the air pressure supply to the second air pressure chamber. The valve means includes a valve housing defining therein a space provided with air inlet and outlet ports connected to the air pump and the engine exhaust system, respectively, and an air release port. The valve means further includes a valve seat member disposed in the space between the air inlet and release ports for movement with the outer periphery of the valve seat member being in sealing and slidable engagement with the inner peripheral surface of the space. The valve seat member defines a main air release opening and at least one auxiliary air release opening all adapted to be communicated with the air release port. The valve means further includes a first valve member disposed in the space between the air outlet port and the main air release opening in the valve seat member and operatively connected to the diaphragm for movement thereby to control the communication between the air inlet and outlet ports and between the air inlet port and the main air release opening in the valve seat member, a stop means for limiting the movement of the valve seat member toward the first valve member, a second spring member yieldably urging the valve seat member against the stop means, a second valve member disposed in the space between the valve seat member and the air release port to control the communication between the auxiliary air release opening and the air release port, and a third spring member yieldably urging the second valve member against the valve seat member to cause the second valve member to interrupt the communication between the auxiliary air release opening and the air release port. The first controlling means is operative to supply the air pressure into the first air pressure chamber at least at the initial stage of an engine acceleration operation while the second controlling means is operative to interrupt the supply of the air pressure into the second air pressure chamber at least at the initial stage of the engine acceleration operation whereby the valve actuator moves the first valve member together with the valve seat member and the second valve member away from the air outlet port against the second and third spring members.

By the feature of the invention discussed above, the second and third spring members are subjected to compression at the initial stage of an engine accelerating operation due to the movement of the first and second valve members and the valve seat member away from the air outlet port, with the result that the air release pressure at which the second valve member is moved by the air pressure away from the valve seat member to permit release of air through the auxiliary air release opening therein is increased to thereby decrease the release of air and increase the secondary air supply into the engine exhaust system whereby increased amount of the air from the air pump flows through the air outlet port of the valve means and through the secondary air supply line into the engine exhaust system at the initial stage of the engine acceleration operation. The more abrupt the engine acceleration, the higher the air release pressure.

The first control pressure line may preferably be pneumatically connected to the engine intake system. The first controlling means may include a third valve member and a first vacuum-responsive valve actuator responsive to variation of the engine intake vacuum to actuate the third valve member so that, when the engine intake vacuum supplied to the first vacuum-responsive valve actuator is decreased substantially to the atmospheric pressure, the first air pressure chamber is communicated with the engine intake system but not with the secondary air supply line. The second controlling means may include a fourth valve member and a second vacuum-responsive valve actuator responsive to variation of the engine intake vacuum to actuate a fourth valve member so that, when the engine intake vacuum supplied to the second vacuum-responsive valve actuator is decreased substantially to the atmospheric pressure, the second air pressure chamber is communicated with the secondary air supply line. Preferably, the first and second controlling means may further include first and second pressure delay valve means operative to transmit with a predetermined time delay a decrease of the engine intake vacuum to the first and second vacuum-responsive valve actuators so that, after the lapse of a predetermined period of time from the beginning of an engine acceleration operation, the first air pressure chamber is supplied with the engine intake vacuum while the second pressure chamber is supplied with the air pressure from the secondary air supply line, with a resultant advantage that the first valve member is moved away from the valve seat member and into sealing engagement with the peripheral edge portion of the air outlet port of the valve means in the secondary air supply line to release substantially all the air from the air pump through the main air release opening in the valve seat member and through the air release port in the first-said valve housing and to interrupt the supply of the secondary air into the engine exhaust system when the engine acceleration operation has lasted for more than said predetermined period of time.

The above and other objects, features and advantages of the present invention will be made more apparent by the following description with reference to the accompanying drawing.

BRIEF DESCRIPTION OF THE DRAWING

The accompanying drawing diagrammatically illustrates an embodiment of a secondary air supply system for an internal combustion engine according to the present invention.

DESCRIPTION OF A PREFERRED EMBODIMENT

Referring to the drawing, an internal combustion engine 1 having a conventional intake system 2 with a throttle valve 3 therein and an exhaust system 4 is shown as being equipped with a secondary air supply system 10 which is a preferred embodiment of the present invention. The system 10 includes an air pump 12 driven by the engine 1 through an endless belt 5 and pneumatically connected to an air cleaner 6 at the inlet end of the engine intake system 2. A secondary air supply line 14 comprising conventional conduits extends from the air pump 12 and terminates in an air injection manifold 16 through which secondary air from the air pump 12 is supplied into an exhaust manifold of the engine 1. A check valve 18 of a conventional structure is provided in the line 14 to prevent exhaust gas flow through the line 14 toward the air pump 12. An air flow change-over valve 20 is also provided in the secondary air supply line 14 between the air pump 12 and the check valve 18.

The air flow change-over valve 20 comprises a housing formed by two housing parts 102 and 104 hermetically secured together with a diaphragm 106 disposed therebetween to define with the housing parts first and second air pressure chambers 108 and 110. A small orifice 112 is formed in the diaphragm 106 to communicate the first chamber 108 with the second chamber 110. A first compression coil spring 114 is disposed in the first chamber 108 and extends between the first housing part 102 and the diaphragm 106 to resiliently bias the same away from the first housing part. The first and second chambers 108 and 110 are provided with air ports 116 and 118 formed in the first and second housing parts, respectively. The air ports 116 and 118 are respectively pneumatically connected with first and second control air supply lines 22 and 24 having upstream ends pneumatically connected to the secondary air supply line 14 at points 26 and 28 both upstream of the air flow change-over valve 20.

On the side of the first air pressure chamber 108 remote from the second air pressure chamber 110, the housing defines therein a generally cylindrical space 120 which is divided into two chambers 122 and 124, as will be described in more detail later. The chambers 122 and 124 are axially generally aligned with the chambers 108 and 110. The chamber 122 is provided with secondary air inlet and outlet 122a and 122b connected to the upstream and downstream parts of the secondary air supply line 14, respectively. The chamber 122 is designed to act as a part of the secondary air supply line 14 when the secondary air inlet and oulet 122a and 122b are in communication with each other. The communication between the inlet and outlet 122a and 122b is controlled by a first valve member 126 connected to the diaphragm 106 by a valve stem 126a which extends movably through the chambers 108 and 124 and sealingly through a partition 102a provided therebetween by housing part 102 so that, when the diaphragm 106 is deformed downwardly, as viewed in the drawing, against the first spring 114, the first valve member 126 is moved toward and into sealing engagement with an annular valve seat 122b' provided along the inner peripheral edge of the secondary air outlet 122b.

When the first valve member 126 is in engagement with the valve seat 122b', as discussed above, the secondary air from the air pump 12 will all be released into the atmosphere in a manner to be discussed hereunder. The first housing part 102 is further provided with an air release port 124a open to the chamber 124 which is disposed between the first air pressure chamber 108 and the chamber or secondary air passage 122. The chamber 124 is cylindrical, as mentioned previously. An annular valve seat member 128 defining therein a central or main air passage opening 128a and auxiliary air passage apertures 128b has an outer peripheral surface in slidable and sealing engagement with the inner peripheral surface of the chamber 124 and is resiliently urged by a second compression coil spring 130 against a stop provided by an annular flange 132 extending radially inwardly from the inner peripheral surface of the first housing part 102 between the secondary air inlet 122a and air release port 124a. A sealing ring (not shown) of an elastomeric material or a labyrinth packing (not shown) may preferably be provided between the outer periphery of the valve seat member 128 and the inner peripheral surface of the chamber 124 to enhance air tight sealing therebetween. The valve seat member 128 surrounds the valve stem 126a. The main air passage opening 128a formed in the valve seat member 128 is of a diameter such that the opening 128a is closed by the first valve member 126 when the valve seat member 128 and the valve member 126 are engaged with each other. The auxiliary air passage apertures 128b are arranged along a circle of a diameter slightly larger than that of the first valve member 126 so that the auxiliary air passage apertures 128b are not closed by the first valve member 126.

A second valve member 134 is disposed in the chamber 124 and resiliently urged by a third compression coil spring 136 against the valve seat member 128. The third spring 136 is disposed coaxially with and radially inwardly of second spring 130. The valve stem 126a extends axially through the springs 130 and 136 and substantially sealingly through a central hole 134a in the second valve member 134. An air release opening 134b is formed in the second valve member 134 in generally aligned relationship with the main air passage opening 128a in the valve seat member 128. The blind portion of the second valve member 134 is adapted to close the auxiliary air passage apertures 128b in the valve seat member 128 when the second valve member is in engagement with the valve seat member 128. The springs 130 and 136 for the valve seat member 128 and the second valve member 134 respectively are determined such that the initial load on the valve seat member 128 by the spring 130 is greater than that applied on the valve member 134 by the spring 136 and such that, when the difference in air pressure between the first and second air pressure chambers 108 and 110 acts on the diaphragm 106 to deform the same upwardly as viewed in the drawing, the first valve member 126 is lifted upwardly together with the valve seat member 128 and the second valve member 134 against the second and third compression coil springs 130 and 136.

The supply of air pressure from the air pump 12 into the first air pressure chamber 108 of the air flow change-over 20 is controlled by a first air pressure supply controlling means 30 which includes a change-over valve 31 disposed in the first control pressure line 22 and comprising a valve housing 142 defining therein two chambers 144 and 146 separated by a partition 148 and adapted to be communicated with each other by an opening 150 formed in the partition. The first chamber 144 is provided with a first port 152 substantially in axial alignment with the opening 150 and connected to the part of the line 22 connected to the secondary air supply line 14, and a second port 156 connected to the part of the line 22 connected to the first air pressure chamber 108 of the valve 20. The second chamber 146 is provided with a vacuum inlet port 158 connected by a first vacuum supply line 32 to the intake manifold of the engine 1. A changing-over valve member 162 is disposed in the chamber 144 for movement between a first position to close the opening 150 and open the port 152, as shown in the drawing, and a second position to close the port 152 and open the opening 150. It will be appreciated that, when the valve member 162 is in the position shown, the air pressure from the air pump 12 is fed through the line 22 and through the chamber 144 into the first chamber 108 of the valve 20. However, when the valve member 162 is in the second position to open the opening 150 and close the port 152, the first pressure chamber 108 of the valve 20 is communicated through the chambers 144 and 146 of the controlling means 30 and through the vacuum supply line 32 to the engine intake manifold. The valve member 162 is operatively connected by a valve stem 166 to a valve actuator which, in the illustrated embodiment of the invention, comprises a diaphragm 168 which defines with the housing 142 a vacuum chamber 170 into which the engine intake vacuum in the vacuum supply line 32 is supplied through a branched vacuum line 34 connected at one end to the vacuum supply line 32 at a point 36 and at the other end to a vacuum inlet 170a of the vacuum chamber 170. A compression coil spring 172 is provided in the vacuum chamber 170 and tends to resiliently bias the diaphragm 168 against the force of the vacuum acting on the diaphragm 168. The diaphragm 168 also defines with the housing 142 a pressure chamber 173 communicated with the atmosphere through a vent port 173a.

The means 30 for controlling the supply of air pressure from the air pump 12 into the first air pressure chamber 108 of the valve 20 also includes a pressure-delay valve 38 comprising a valve housing 174 and a partition 175 extending across the interior of the housing 174 to divide the same into two chambers 176 and 177 which are always communicated with the engine intake manifold and the chambers 146 and 170 of the change-over valve 31, respectively. The partition has formed therein first and second orifices 178 and 179. A check valve 180 is provided for the second orifice 179 to permit air flow only from the chamber 177 through the orifice 179 to the chamber 176, although the other orifice 178 permits air flow therethrough in either direction. Thus, when the engine intake vacuum is suddenly decreased due to an abrupt acceleration of the engine operation wherein the throttle valve 3 is widely open, the decrease of the intake vacuum is transmitted to the vacuum chamber 170 of the change-over valve 31 with a time delay because of the pressure delay valve 38 so that the vacuum in the vacuum chamber 170 is maintained for a predetermined period of time after the vacuum in the engine intake system has been decreased. However, when the engine intake vacuum is increased, the increase is immediately transmitted through the pressure delay valve 38 to the vacuum chamber 170.

The supply of air pressure from the air pump 12 into the second air pressure chamber 110 of the air flow change-over valve 20 is controlled by a second air pressure supply controlling means 40 which includes an on-off valve 42 disposed in the second control pressure line 24 and comprising a valve housing 181 defining therein a first chamber 182 provided with a first port 183 connected to the part of the line 24 connected to the secondary air supply line 14 at a point 28 and a second port 184 connected to the part of the line 24 connected to the second air pressure chamber 110 of the air flow change-over valve 20. A valve member 185 is disposed in the chamber 182 of the valve 42 for movement into and away from sealing engagement with an annular valve seat provided around the inner peripheral edge of the port 184 to thereby control the communication between the secondary air supply line 14 and the second air pressure chamber 110 of the valve 20. The valve member 185 is mechanically connected to a valve actuator which, in the illustrated embodiment, comprises a diaphragm 186 defining with the valve housing 181 a vacuum chamber 187 and a pressure chamber 190. In the vacuum chamber 187, a compression coil spring 188 is disposed to resiliently bias the diaphragm 186 against the atmospheric pressure in the pressure chamber 190 which is communicated with the atmosphere through a vent port 190a. The vacuum chamber 187 is provided with a vacuum inlet 189 connected to a second vacuum supply line 42 which in turn is connected to the first vacuum supply line 32 at a point 44 nearer to the engine intake manifold than the pressure delay valve 38. The valve member 185 is moved away from the port 184 when the vacuum pressure in the chamber 187 is decreased to cause the diaphragm 186 to be deformed by the spring 188 upwardly as viewed in the drawing.

The means 40 for controlling the supply of the air pressure from the air pump 12 into the second air pressure chamber 110 of the valve 20 also includes a second pressure delay valve 46 disposed in the second vacuum supply line 42. The valve 46 is substantially similar in structure and operation to the first pressure delay valve 38 described previously. Thus, it will be sufficient to note that parts of the valve 46 similar to those of the valve 38 are deignated by similar reference numerals each followed by "a".

The operation of the system described above will now be described. Assuming that the engine 1 is running at a substantially constant speed with the throttle valve 3 being partly open, the vacuum chamber 170 of the valve 31 is supplied with a sufficient vacuum pressure to move the valve member 162 away from the port 152 so that the first air pressure chamber 108 of the valve 20 is pneumatically connected to the secondary air supply line 14 through the first control air supply line 22. The vacuum chamber 187 of the valve 42 is also supplied with a sufficient vacuum pressure to move the valve member 185 into engagement with the valve seat of the port 184 to interrupt the communication of the second air pressure chamber 110 of the valve 20 through the second control air supply line 24 with the secondary air supply line 14. The air pump 12 is discharging pressurized air at a constant pressure because the engine speed at this time is constant, as mentioned above. The first and second air pressure chambers 108 and 110 of the valve 20 are at the same pressure level because these chambers are communicated through the orifice 112. The first valve member 126 of the valve 20 is lifted upwardly as viewed in the drawing solely by the force of the first spring 114 to close the main air release opening 128a in the valve seat member 128, as shown in the drawing, so that the pressurized air from the air pump 12 flows through the port 122b, the check valve 18 in the line 14 and the air injection manifold 16 into the exhaust manifold of the engine 1. The air pressure in the chamber 122 in the valve 20 is exerted through the auxiliary air release apertures 128b in the valve seat member 128 to the second valve member 134. If the air pressure is larger than the pressure applied to the second valve member 134 by the initial spring force of the coil spring 136, the valve member 134 is lifted against the spring 136 to release the air through the air release apertures 128b in the valve seat member 128, through the air passage opening 134b in the second valve member 134, through the chamber 124 and through the air release port 124a into the atmosphere so that the secondary air in the line 14 is kept at a predetermined controlled pressure level.

When the throttle valve 3 is abruptly opened wide for the acceleration of the engine 1, the engine intake vacuum is decreased. In this case, however, the pressure delay valves 38 and 46 operate to transmit with a predetermined time delay the decrease of the engine intake vacuum to the vacuum chambers 170 and 187 of the valves 31 and 42 so that the valve members 162 and 185 are held in the positions shown for the predetermined time period after the occurence of the decrease in the intake manifold vacuum. In addition, the acceleration of the engine 1 causes an increase in the air pressure discharged from the air pump 12. The air pressure increase cuases a pressure difference between the first and second air pressure chambers 108 and 110 of the valve 20. This pressure difference acts on the diaphragm 106 upwardly, as viewed in the drawing, and lasts for a predetermined time period which, in general, is equal to from several to more than 10 seconds and which is dependent on the diameter of the orifice 112 and the volume of the second air pressure chamber 110. The spring 114 in the first air pressure chamber 108 cooperates with the pressure difference across the diaphragm 106 to move the first valve member 126 together with the valve seat member 128 and the second valve member 134 against the coil springs 130 and 136 in the chamber 124 so that two these springs are compressed with resultant increase in the pressure level (air-release pressure) at which the second valve member 134 is lifted by the air pressure in the secondary air supply line 14 to release the air from the chamber 122 through the air release passage 134b and through the air release port 124a into the atmosphere. The more abrupt the engine acceleration, the larger the pressure difference across the diaphragm 106. The more abrupt the engine acceleration, therefore, the higher the air release pressure of the second valve member 134. Thus, at the initial stage of an engine acceleration operation, release of air through the apertures 128b in the valve seat member 128 and through the air release passage 134b in the second valve member 134 into the chamber 124 is decreased and almost all the air from the air pump 112 flows through the port 122b and through the air injection manifold 16 into the engine exhaust system to advantageously purify the engine exhaust gases which contain increased amounts of CO and HC gases particulary at the initial stage of engine acceleration operation.

It is also to be noted that, even during the initial stage of the engine acceleration operation, a portion of the air from the air pump 12 may be released into the atmosphere when the air pressure in the chamber 122 of the valve 20, which is exerted to the second valve member 134 through the apertures 128b, becomes higher than the increased air release pressure of the second valve member 134 caused by the force of the compression spring 136. Accordingly, the system described does not supply the engine exhaust system with an unduly increased amount of secondary air larger than that required and thus prevents the exhaust gas purifying device from being overheated.

In the case where an engine acceleration operation is continued for a long time, the pressure levels in the vacuum chambers 170 and 187 in the valves 31 and 42 respectively become substantially equal to the atmospheric pressure after the lapse of a predetermined time period from the beginning of the engine acceleration. Thus, the valve member 162 of the valve 31 is moved by the spring 172 to close the port 152 so that the chamber 144 in the valve 31 now intercommunicates the first air pressure chamber 108 of the valve 20 and the intake manifold 12 of the engine 1. Simultaneously, the valve member 185 of the valve 42 is lifted by the spring 188 away from the port 184 so that the chamber 182 in the valve 42 now intercommunicates the second air pressure chamber 110 with the secondary air supply line 14. After the lapse of said predetermined time period from the beginning of the engine acceleration, therefore, the pressure in the second air pressure chamber 110 of the valve 20 becomes higher than the pressure in the first air pressure chamber 108 so that the diaphragm 106 is deformed downwardly, as viewed in the drawing, against the spring 114 to move the valve member 126 into sealing engagement with the valve seat 122b' of the port 122b with the result that all the air from the air pump 12 is released from the chamber 122 through the air release opening 128a in the valve seat member 128, the air passage opening 134b in the second valve member 134, the chamber 124 and through the air release port 124a into the atmosphere.

During an engine deceleration operation, the vacuum chambers 170 and 187 of the valves 31 and 42 are supplied with sufficient vacuum to maintain the valve members 162 and 185 in the positions shown, respectively. The pressure of the air discharged from the air pump 12 is decreased due to the decrease of the speed of the engine revolution with the result that a pressure difference is produced across the diaphragm 106. This pressure difference lasts for a predetermined time period and tends to deform the diaphragm 106 downwardly as viewed in the drawing. In the case where the downward force produced by the pressure difference is greater than the force of the spring 114, the valve member 126 will be moved downwardly to partly or fully open the main air release opening 128a in the valve seat member 128 so that either a part of or all of the air from the air pump 12 will be released through the opening 128b, the air release passage 134b, the chamber 124 and the air release port 124a into the atmosphere.

The embodiment of the invention described above may have various modifications. For example, the air release port 124a can be connected by a hose or conduit to the air cleaner 6 to feed the released air back into the engine intake system. The orifice 112 in the diaphragm 106 can be replaced by a plurality of small apertures or perforations formed in the diaphragm. A filter can be provided for the orifice 112 to protect the same against foreign particles. The volume of the second air pressure chamber 110 of the air flow change-over valve 20 can be increased by providing a container outside the second housing part 104 of the valve and by pneumatically connecting the container to the chamber 110. A further valve can be provided in the vacuum supply line 132 between the engine intake manifold 2 and the point 44 and can be opened or closed in accordance with an engine operation parameter such as a temperature of the engine cooling water, for example. Each of the valve actuators of the valves 31 and 42, which have been described and illustrated as comprising diaphragms 168 and 186, respectively, can be replaced by an electric valve control unit comprising a solenoid operatively associated with the valve member 162 or 185 and an electric switch responsive to variation in the vacuum pressure from the pressure delay valve 38 or 46 to electrically energize or deenergize the solenoid for the actuation of the valve member.

What is claimed is:

1. A secondary air supply system for an internal combustion engine, comprising:
   an air pump adapted to be driven by an engine;
   a secondary air supply line extending between said air pump and the engine exhaust system;
   valve means in said secondary air supply line for controlling the secondary air supply from said air pump into said engine exhaust system;
   a valve actuator operatively associated with said valve means and comprising first and second air pressure chambers, a diaphragm between said air pressure chambers, a first spring member disposed in said first air pressure chamber to yieldably act on said diaphragm and restricted passage means intercommunicating said first and second air pressure chambers;
   a first control pressure line through which the air pressure produced by said air pump is supplied into said first air pressure chamber;
   first controlling means in said first control pressure line for controlling the air pressure supply to said first air pressure chamber;
   a second control pressure line through which the air pressure produced by said air pump is supplied into said second air pressure chamber; and
   second controlling means in said second control pressure line for controlling the air pressure supply to said second air pressure chamber;
   said valve means including a valve housing defining therein a space provided with air inlet and outlet ports connected to said air pump and said engine exhaust system, respectively, and an air release port;
   said valve means further including a valve seat member disposed in said space between said air inlet and release ports for movement, the outer periphery of said valve seat member being in sealing and slidable engagement with the inner peripheral surface of said space, said valve seat member defining a main air release opening and at least one auxiliary air release opening all adapted to be communicated with said air release port;

said valve means further including a first valve member disposed in said space between said air outlet port and said main air release opening in said valve seat member and operatively connected to said diaphragm for movement thereby to control the communication between said air inlet and outlet ports and between said air inlet port and said main air release opening in said valve seat member, a stop means for limiting the movement of said valve seat member toward said first valve member, a second spring member yieldably urging said valve seat member against said stop means, a second valve member disposed in said space between said valve seat member and said air release port to control the communication between said auxiliary air release opening in said valve seat member and said air release port, and a third spring member yieldably urging said second valve member against said valve seat member to cause said second valve member to interrupt the communication between said auxiliary air release opening and said air release port;

said first controlling means being operative to supply the air pressure into said first air pressure chamber at least at the initial stage of an engine acceleration operation while said second controlling means is operative to interrupt the supply of the air pressure into said second air pressure chamber at least at the initial stage of the engine acceleration operation whereby said valve actuator moves said first valve member together with said valve seat member and said second valve member away from said air outlet port against said second and third spring members.

2. A secondary air supply system according to claim 1, wherein said first controlling means comprise a second valve housing provided with first and second ports pneumatically connected to said secondary air supply line upstream of said valve means and to said first air pressure chamber of said valve actuator, respectively, and a third port pneumatically connected to the engine intake system, a third valve member disposed in said second valve housing for movement between said first and third ports to change-over the communication of said first air pressure chamber of said valve actuator with said secondary air supply line and with said engine intake system, a first vacuum-responsive valve actuator operatively associated with said third valve member and responsive to variation of the engine intake vacuum to actuate said third valve member, said vacuum-responsive valve actuator comprising a second diaphragm cooperative with said second valve housing to define a first vacuum chamber pneumatically connected to said engine intake system and a fourth spring member operative to move said third valve member so that said first air pressure chamber is communicated with said engine intake system but not with said secondary air supply line when the vacuum pressure in said first vacuum chamber is decreased substantially to the atmospheric pressure, and a first pressure delay valve means operative to transmit with a predetermined time delay a decrease of the engine intake vacuum to said first vacuum chamber, and wherein said second controlling means comprise a third valve housing provided with third and fourth ports pneumatically connected to said secondary air supply line upstream of said valve means and to said second air pressure chamber of said valve actuator, a fourth valve member disposed in said third valve housing for movement to control the communication between said second air pressure chamber and said secondary air supply line, a second vacuum-responsive valve actuator operatively associated with said fourth valve member and responsive to variation of the engine intake vacuum to actuate said fourth valve member, said second vacuum-responsive valve actuator comprising a third diaphragm cooperative with said third valve housing to define a second vacuum chamber pneumatically connected to said engine intake system and a fifth spring member operative to move said fourth valve member so that said second air pressure chamber is communicated with said secondary air supply line when the vacuum pressure in said second vacuum chamber is decreased substantially to the atmospheric pressure, and a second pressure delay valve means operative to transmit with a predetermined time delay a decrease of the engine intake vacuum to said second vacuum chamber.

* * * * *